United States Patent
Rong et al.

(10) Patent No.: US 11,030,336 B2
(45) Date of Patent: Jun. 8, 2021

(54) SWITCHING METHOD, ELECTRONIC DEVICE, AND STORAGE MEDIUM

(71) Applicant: LENOVO (BEIJING) CO., LTD., Beijing (CN)

(72) Inventors: Haofei Rong, Beijing (CN); Yuhao Kuang, Beijing (CN); Jincai Xu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 87 days.

(21) Appl. No.: 16/025,055

(22) Filed: Jul. 2, 2018

(65) Prior Publication Data
US 2019/0005264 A1 Jan. 3, 2019

(30) Foreign Application Priority Data
Jun. 30, 2017 (CN) .......................... 201710523503.0

(51) Int. Cl.
| | | |
|---|---|---|
| G06F 7/04 | (2006.01) | |
| G06F 21/62 | (2013.01) | |
| G06F 21/60 | (2013.01) | |
| H04N 7/16 | (2011.01) | |

(52) U.S. Cl.
CPC ........ G06F 21/6245 (2013.01); G06F 21/604 (2013.01)

(58) Field of Classification Search
CPC .................... G06F 21/6245; G06F 21/604
See application file for complete search history.

(56) References Cited

U.S. PATENT DOCUMENTS

| | | | | |
|---|---|---|---|---|
| 8,922,480 B1* | 12/2014 | Freed | ...................... | G06F 21/60 345/156 |
| 2010/0205667 A1* | 8/2010 | Anderson | ............... | G06F 3/017 726/19 |
| 2012/0260307 A1* | 10/2012 | Sambamurthy | ......... | G06F 21/60 726/1 |
| 2013/0007842 A1* | 1/2013 | Park | ........................ | G06F 21/74 726/3 |
| 2014/0215356 A1* | 7/2014 | Brander | .................... | G06F 3/14 715/753 |
| 2015/0026816 A1* | 1/2015 | Gao | ..................... | G06F 21/6245 726/26 |
| 2015/0046834 A1* | 2/2015 | Wu | ...................... | H04L 12/1827 715/748 |

(Continued)

FOREIGN PATENT DOCUMENTS

| | | | |
|---|---|---|---|
| CN | 103678979 A | * | 12/2013 |
| CN | 103678979 A | | 3/2014 |

*Primary Examiner* — Darshan I Dhruv
(74) *Attorney, Agent, or Firm* — Anova Law Group, PLLC

(57) ABSTRACT

A switching method, an electronic device, and a storage medium are provided. The switching method includes detecting whether a triggering condition is satisfied in a first mode of an electronic device, and in response to the triggering condition being satisfied, switching from the first mode to a second mode. The first mode enables acquisition and output of analysis data. The second mode enables acquisition of the analysis data and non-output of at least one part of the analysis data. The analysis data are related to historical data of one or more of the electronic device, an application in the electronic device, and an owner of the electronic device.

16 Claims, 2 Drawing Sheets

(56) References Cited

U.S. PATENT DOCUMENTS

| | | | |
|---|---|---|---|
| 2015/0113666 A1* | 4/2015 | Buck | G06F 21/554 |
| | | | 726/28 |
| 2015/0286840 A1* | 10/2015 | Karlson | G06F 21/62 |
| | | | 726/28 |
| 2015/0332439 A1* | 11/2015 | Zhang | G06K 9/726 |
| | | | 345/647 |
| 2016/0057090 A1* | 2/2016 | Faaborg | H04W 4/21 |
| | | | 709/206 |
| 2016/0352712 A1* | 12/2016 | Tamp | G06F 21/6245 |
| 2018/0096113 A1* | 4/2018 | Hassan | G06F 3/04847 |
| 2018/0210739 A1* | 7/2018 | Bao | G06F 3/14 |
| 2018/0285592 A1* | 10/2018 | Sharifi | G06F 21/84 |
| 2018/0336373 A1* | 11/2018 | Deenadayal | G06F 21/84 |

* cited by examiner

US 11,030,336 B2

SWITCHING METHOD, ELECTRONIC DEVICE, AND STORAGE MEDIUM

CROSS-REFERENCES TO RELATED APPLICATIONS

This application claims priority of Chinese Patent Application No. 201710523503.0, filed on Jun. 30, 2017, the entire contents of which are hereby incorporated by reference.

FIELD OF THE DISCLOSURE

The present disclosure generally relates to the field of information processing technologies and, more particularly, relates to a switching method, an electronic device, and a storage medium.

BACKGROUND

In many cases, contents on a desktop of an electronic device may be viewed by others. For example, when giving a demonstration to others using a projector, the contents on the desktop may have to be displayed. In another example, when remotely operating an electronic device, remote users may see the displayed content on the desktop. In these scenarios, if the contents displayed on the screen contain the user's personal, private information or related information, the privacy of the user is under risk, resulting in unpleasant user experience.

The disclosed switching method, electronic device, and storage medium are directed to solving at least partial problems set forth above and other problems.

BRIEF SUMMARY OF THE DISCLOSURE

One aspect of the present disclosure provides a switching method. The switching method includes detecting whether a triggering condition is satisfied in a first mode of an electronic device, and in response to the triggering condition being satisfied, switching from the first mode to a second mode. The first mode enables acquisition and output of analysis data, the second mode enables acquisition of the analysis data and non-output of at least one part of the analysis data, and the analysis data are related to historical data of one or more of the electronic device, an application in the electronic device, and an owner of the electronic device.

Another aspect of the present disclosure provides an electronic device. The electronic device includes an output interface for outputting analysis data, and a processor coupled with the output interface. In a first mode, the processor detects whether a triggering condition is satisfied. In response to the triggering condition being satisfied, the processor controls the electronic device to switch from the first mode to a second mode. The first mode enables acquisition and output of analysis data, the second mode enables acquisition of the analysis data and non-output of at least one part of the analysis data, and the analysis data are related to historical data of one or more of an electronic device, an application in the electronic device, and an owner of the electronic device.

Another aspect of the present disclosure provides a non-transitory computer-readable storage medium, having a computer-executable instructions stored thereon. In response to being executed, the computer-executable instructions cause a processor to perform a switching method. The method includes: detecting whether a triggering condition is satisfied in a first mode of an electronic device; and in response to the triggering condition being satisfied, switching from the first mode to a second mode. The first mode enables acquisition and output of analysis data. The second mode enables acquisition of the analysis data and non-output of at least one part of the analysis data. The analysis data are related to historical data of one or more of the electronic device, an application in the electronic device, and an owner of the electronic device.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in disclosed embodiments of the present disclosure, drawings necessary for the description of the disclosed embodiments are briefly introduced below. Obviously, the drawings described below are only some embodiments of the present disclosure, and it is possible for those ordinarily skilled in the art to derive other drawings from these drawings without creative effort.

DETAILED DESCRIPTION

Reference will now be made in detail to various embodiments of the disclosure, which are illustrated in the accompanying drawings. Hereinafter, embodiments consistent with the disclosure will be described with reference to drawings. It is apparent that the described embodiments are merely a part of, rather than entire, embodiments of the present disclosure. On the basis of the disclosed embodiments, other embodiments obtainable by those ordinarily skilled in the art without creative effort shall fall within the scope of the present disclosure.

Figure 1:
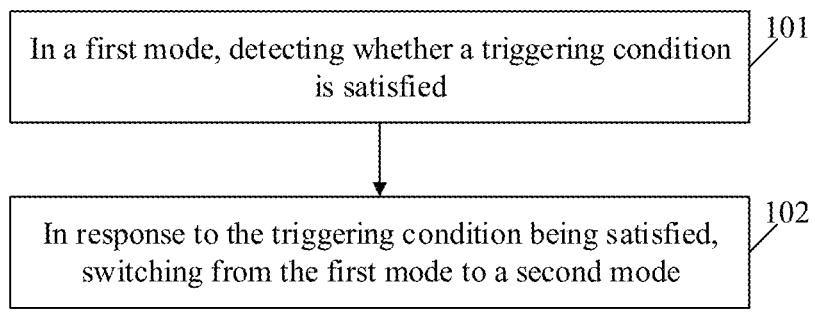
FIG. 1 illustrates a schematic flowchart of a switching method consistent with some embodiments of the present disclosure.

The present disclosure provides a switching method. FIG. 1 illustrates a schematic flowchart of a switching method consistent with some embodiments of the present disclosure.

Referring to FIG. 1, the method may include the following.

In 101, detecting whether a triggering condition is satisfied in a first mode; and In 102, in response to the triggering condition being satisfied, switching from the first mode to a second mode.

In some embodiments, the switching method may be applied to an electronic device. The electronic device may be a device having an image-data output (or transmission) and/or display function. For example, the electronic device may be a mobile phone, a tablet, a laptop computer, a desktop computer, or any other appropriate electronic device. In some other embodiments, the switching method may be applied to an application (or a client) running in an electronic device. The application may include computer-executable instructions for executing the switching method according to the embodiments of the present disclosure.

In the following, an electronic device is taken as an example of the principal implementation part to illustrate various embodiments of the disclosed switching methods. Description of the embodiments of the disclosed switching methods in which an application is taken as the principal implementation part will not be provided in the present disclosure. Instead, reference can be made to the corresponding description of the embodiments in which the electronic device is taken as the principal implementation part.

In some embodiments, the electronic device may have at least two modes: a first mode and a second mode. The first mode may be a mode in which analysis data can be acquired and outputted, and the second mode may be a mode in which analysis data can be acquired but at least one part of the analysis data may not be outputted. The analysis data may be data related to the historical data of one or more of the electronic device, an application in the electronic device, and the owner of the electronic device. The at least one part of the analysis data may include all the analysis data or a part of the analysis data. That is, the at least one part of the analysis data may include all the data that are related to the historical data of one or more of the electronic device, the application in the electronic device, and the owner of the electronic device, or a part of the data that are related to the historical data of one or more of the electronic device, the application in the electronic device, and the owner of the electronic device.

For example, the historical data may include, for example, at least one of the followings: data including the user information, data including the historical search record, data including the historical browsing record, and any other data that the owner of the electronic device is unwilling to disclose or unwilling to let others know, i.e. privacy data, or any data related to the privacy data that the owner of the electronic device is unwilling to disclose or unwilling to let others know.

In some embodiments, the analysis data may be the historical data of one or more of the electronic device, an application of the electronic device, and the owner of the electronic device. The historical data of one or more of the electronic device may be, for example, the historical operation record of the electronic device, such as an item opened in a recent period of time (the item may be, for example, an opened file/folder, an opened application, etc.). The historical data of one or more of the application in the electronic device may include, for example, the historical data of an application (the application may be any application of the electronic device, such as a social application, a multimedia application, etc.), such as the charting record in a recent period of time, the search record of a browser application, the historical purchase record in a shopping application or in a shopping webpage, etc. The historical data of the owner of the electronic device may be the information of the owner of the electronic device, such as a mobile phone number, an account number and a password of a social application, a payment account number and a password, etc.

In some embodiments, the analysis data may be analysis results obtained by analyzing the historical data of one or more of the electronic device, the application in the electronic device, and the owner of the electronic device. For example, the analysis data may be the analysis results of the historical operation record of the electronic device, the analysis results of the historical data of one or more of the application in the electronic device, the analysis result of the information of the owner of the electronic device, and any other appropriate analysis results.

In some embodiments, the analysis data may be relevant or recommended data generated in response to the analysis results obtained by analyzing the historical data of one or more of the electronic device, the application in the electronic device, and the owner of the electronic device. For example, the analysis data may be relevant or recommended data generated in response to the analysis results obtained by analyzing the historical operation record of the electronic device. Alternatively, the analysis data may be relevant or recommended data generated in response to the analysis results obtained by analyzing the historical data of an application in the electronic device, or may be relevant or recommended data generated in response to the analysis results obtained by analyzing the information of the owner of the electronic device.

As an example of application scenario, in response to the analysis of a historical purchase record in a shopping application or a shopping webpage, the relevant or recommended data may be, for example, a recommended advertisement, pushed to a recommendation position in a webpage or in an application, for an item that is the same as or similar to an item in the historical purchase record.

As another example of application scenario, in response to the analysis of the type of a game application or the type of a game webpage, the relevant or recommended data may be, for example, a recommended advertisement, pushed to a recommendation position in a webpage or in an application, for a game having a same or similar type as the game application or the game webpage.

As another example of application scenario, in response to the analysis of the historical search record, the relevant or recommendation data may be, for example, key words or key characters displayed in the current search operation that are the same as or similar to the historical search record. For example, during a search operation of a search engine, the key words searched most recently may be displayed, or when a search engine performs a search operation, and a key word or a key character is entered, the key words or key characters that are related to the entered key word or key character and have not been outputted may be displayed.

In some embodiments, the first mode and the second mode of the electronic device are modes capable of acquiring the analysis data. However, the first mode may also be a mode capable of outputting the analysis data, that is, the first mode may be a mode in which the analysis data may be outputted or may be displayed. In other words, the first mode may be a mode in which the analysis data may be acquired by people other than the owner of the electronic device. In addition, the second mode may be a mode in which at least one part of the analysis data may not be outputted. That is, the second mode may be a mode in which at least one part of the analysis data cannot be outputted or displayed. In other words, the second mode may be a mode in which at least one part of the analysis data cannot be acquired by anyone other than the owner of the electronic device.

In some embodiments, the mode of the non-output of the at least one part of the analysis data may include: a mode in which the application corresponding to at least one part of the analysis data in the public state does not output the at least one part of the analysis data, or a mode in which all the applications or the running applications do not output the at least one part of the analysis data.

In some embodiments, in the second mode of the electronic device, the application corresponding to at least one part of the analysis data in the public state may not output the at least one part of the analysis data, or all the applications or the running applications may not output the at least one part of the analysis data. As an implementation example, the application corresponding to at least one part of the analysis data in the public state may, for example, indicate that the application corresponding to the at least one part of the analysis data can be accessed (i.e. viewed) by a user other than the owner of the electronic device. That is, in response to detecting that at least one part of the analysis data or all the analysis data of an application are in the public state, the application may not output any analysis data. For example, in some embodiments, at least one part of the display window of an application is located in a specific display region (e.g., located in an extended display region corresponding to an extended display screen), the at least one part of the display window of the application in the specific display region may not output any analysis data.

As another implementation example, all the applications or the running applications may not output at least one part of the analysis data. That is, all the applications in the electronic device may not output the at least one part of the analysis data, the running applications in the electronic device may not output at least one part of the analysis data, or specific applications (i.e. some of the applications) in the electronic device may not output at least one part of the analysis data. The specific applications may be predetermined.

In some embodiments, as an implementation example, the analysis data may not be output in any display region of the electronic device. In the application scenario, the application corresponding to at least one part of the analysis data in the public state may not output the analysis data, or all the applications, the running applications, or the specific applications may not output the analysis data.

As another implementation example, a specific display region of the electronic device may not output the analysis data. The specific display region may be a region corresponding to a projection window used for outputting the projected data, an extended display region after expanding the display screen, a window region of an application shared through network, or any other appropriate display region. For example, in an application scenario of an extended screen, i.e., in an application scenario in which a host computer is connected to at least two display screens, the specific display region may be a display region corresponding to the extended screen. In some embodiments, when an application that corresponds to at least one part of the analysis data in the public state is located in at least one part of a window that is in the specific display region, or all the applications, the running applications, or the specific applications of the electronic device are located in at least one part of a window that is in the specific display region, the application corresponding to the at least one part of the analysis data in the public state, or all the applications, the running applications, or the specific applications of the electronic device may not output the analysis data. In some other embodiments, when an application that corresponds to at least one part of the analysis data in the public state is located in a window that is not in the specific display region, or all the applications, the running applications, or the specific applications of the electronic device are located in a window that is not in the specific display region, the application corresponding to the at least one part of the analysis data in the public state, or all the applications, the running applications, or the specific applications of the electronic device may be able to output the analysis data.

In some embodiments, an application may output data through at least two processes, and the non-output of the at least one part of the analysis data may include controlling at least one part of the at least two processes to not output the at least one part of the analysis data during data outputting.

In some embodiments, an electronic device is externally connected to an extended display device and the process of outputting display image data by the electronic device is different from the process of transmitting the image data to the extended display device. For the electronic device, the process of transmitting the image data to the extended display device may be controlled such that the electronic device may not transmit the entire analysis data or a part of the analysis data during image data transmission. For example, for an electronic device connected to an external projector, the data displayed locally by the electronic device may include the analysis data, and the data projected by the projector may not include the analysis data. In another example, for an electronic device having an extended display (i.e., the electronic device being connected to an external display), the display window of an application may cover both the display region of the electronic device and the display region of the extended display. That is, the displayed content of the display region of the electronic device and the displayed content of the extended display may together construct the total display content of the application. Therefore, the displayed content in the display region of the electronic device may be controlled to include the analysis data, and the displayed content in the display region of the extended display may be controlled to not include the analysis data.

According to the technical schemes of the present disclosure, in response to a triggering condition being satisfied, the electronic device may be switched to the second mode in which the analysis data may be acquired, but at least one part of the analysis data may not be outputted. In the second mode, data related to the historical data of one or more of the electronic device, an application in the electronic device, and the owner of the electronic device may not be outputted. Therefore, in the second mode, outputting the data related to the privacy of the user may be blocked, preventing the content related to the privacy of the user from being viewed by other users. Therefore, the privacy protection experience of the electronic device may be improved, and the safety of the electronic device may also be also improved.

Figure 2:
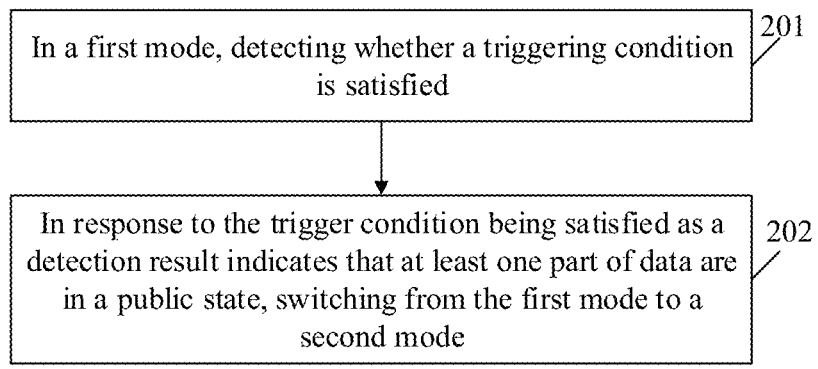
FIG. 2 illustrates a schematic flowchart of another switching method consistent with some embodiments of the present disclosure.

The present disclosure also provides another switching method. FIG. 2 illustrates a schematic flowchart of another switching method consistent with some embodiments of the present disclosure. Referring to FIG. 2, the method may include.

In 201, detecting whether a triggering condition is satisfied in a first mode; and In 202 to, in response to the triggering condition being satisfied as detection result indicates that at least one part of the analysis data are in a public state, switching the first mode to a second mode.

Based on the embodiments described above, in some embodiments, a triggering condition for an electronic device to switch from a first mode to a second mode is to detect whether at least one part of the analysis data are in a public state. A detection result indicating that at least one part of the analysis data are in the public state may be a detection result indicating that at least one part of the analysis data are in a publicly-outputted state, or a detection result indicating that at least one part of the analysis data are accessed by a user other than the owner, i.e., the detection result indicating that at least one part of the analysis data are accessible for users other than the owner.

As a first implementation method, the detection result indicating at least one part of the analysis data are in a publicly-outputted state may include detecting an interface state of a data output interface of the electronic device, a display interface, or an interface for transmitting the display data, and in response to detecting that the interface state of the data output interface of the electronic device, the display interface, or the interface for transmitting the display data is in a connected state, indicating that at least one part of the analysis data are in the publicly-outputted state.

For example, in some embodiments, detecting whether the triggering condition is satisfied may be detecting whether a specific interface is in a connected state. The specific interface may include a data output interface, a display interface, or an interface for transmitting the display data. The data output interface may be, for example, a multimedia interface for connecting a multimedia output device. The multimedia output device may be, for example, a device that supports outputting audio and/or video data, such as a projector. In some embodiments, for an electronic device having a data output interface connected to a projector and is in a connected state, detecting that at least one part of the analysis data are able to be transmitted to the projector for projection display through the data output interface may indicate that the at least one part of the analysis data are in the publicly-outputted state.

The display interface may be, for example, an interface for connecting a display device. The display device may be a monitor, a display screen, or any other device that can be used for display. In some embodiments, for an electronic device having a display interface connected to another monitor or display screen (for example, a scenario where a same host computer is connected to two monitors, or a scenario where a laptop computer is connected to an external display screen during a meeting or a demonstration), detecting that at least one part of the analysis data of the electronic device are able to be simultaneously displayed on the own display screen or monitor of the electronic device and the external display screen or monitor may indicate that the at least one part of the analysis data are in the publicly-outputted state.

The interface for transmitting the display data may be, for example, an interface that supports transmission of multimedia data, such as a wired or wireless communication interface. The wired or wireless communication interface may support transmitting image data to another device with an output function or display function. For example, the electronic device may share its own image data to another electronic device through a wireless communication interface, so that the other electronic device may display the image data. In another example, another electronic device may remotely control the electronic device through a wireless communication interface such that the other electronic device may be able to display the image of the electronic device to indicate that at least one part of the analysis data is in the publicly-outputted state.

As a second implementation method, the detection result indicating at least one part of the analysis data are in a publicly-outputted state may include detecting an interface state of a data output interface of the electronic device, and in response to detecting that at least one part of the analysis data are outputted through the data output interface, indicating that at least one part of the analysis data are in the publicly-outputted state.

In some embodiments, for an electronic device having a data output interface in a connected state, that is, for an electronic device connected to another device through a data output interface, detecting that at least one part of the analysis data of the electronic device are transmitted to the other device through the data output interface may indicate that the at least one part of the analysis data are in a public state. The other device may be, for example, a display device. The display device may be, for example, a device with a display function only, such as a display screen or a monitor. In some other embodiments, the display device may be a device that supports a display function, for example, another electronic device (e.g., a terminal device such as a mobile phone, a tablet computer, a desktop computer).

According to the two implementation methods described above, the at least one part of the analysis data in a public state may also indicate that the at least one part of the analysis data are accessed (i.e., viewed) by a user other than the owner of the electronic device, i.e., the at least one part of the analysis data are accessible for users other than the owner.

As a third implementation method, the detection result indicating that at least one part of the analysis data are accessible to a user other than the owner may include detecting the information of the operators or viewers of at least one part of the analysis data of the electronic device, and in response to detecting that the operators or viewers include at least one user other than the owner, indicating that at least one part of the analysis data are accessed by a user other than the owner, i.e., indicating that at least one part of the analysis data are accessible to users other than the owner.

In some embodiments, detecting that the operators or viewers include users other than the owner may indicate that at least one part of the content outputted and displayed by the electronic device can be accessed or viewed by a user other than the owner. That is, it may be indicated that the electronic device is in a state in which at least one part of the analysis data are accessed by a user other than the owner. In practical applications, the electronic device may detect the information of the operators or viewers through a sensor assembly. The sensor assembly may include an image capturing assembly (e.g. a camera), and by capturing image data using the image capturing assembly (the image capturing assembly may be, for example, a camera in a same plane as a display assembly), faces in the image data may be identified. In response to detecting that the faces in the image data include a face other than the specific face corresponding to the owner, it may be determined that the detected operators or viewers include a user other than the owner.

In some embodiments, the owner of the electronic device may be at least one person having data access right or viewing right. In practical applications, the face image of the owner may be captured and stored in advance. The stored face image data may correspond to at least one owner. For example, when the electronic device is a family electronic device, the owner may be a family member, and the stored face image data may correspond to the family members, respectively; after capturing the face images of the operators or viewers, the captured face image data may be compared to the stored face image data; when there is a discrepancy between the captured face image data and the stored face image data, i.e., among the captured face image data of the operators or viewers, when the face image data of any operator or viewer does not match the stored face image data, it is determined that the operators or viewers include a user other than the owner; similarly, when the captured face image data for every operator or viewer is consistent with the stored image data, it is determined that the operators or viewers do not include any user other than the owner.

As a fourth implementation method, the detection result indicating that at least one part of the analysis data are accessed by a user other than the owner may include detecting the number of the operators or viewers of at least one part of the analysis data of the electronic device, and when the number of the operators or viewers is detected to be greater than 1, indicating that at least one part of the analysis data are accessed by a user other than the owner, i.e., indicating that at least one part of the analysis data are accessible for users other than the owner.

In some embodiments, the electronic device is a personal device such as a laptop computer, a smart mobile phone, or any other appropriate device used by an individual. Therefore, the operator or viewer of the electronic device should be one person (i.e., the owner). When a detected number of the operators or viewers being greater than 1, it is indicated that the operators or viewers of the electronic device include at least one user other than the owner of the electronic device. That is, at least one part of the content outputted and displayed by the electronic device can be accessed or viewed by a user other than the owner. In other words, it is indicated that at least one part of the analysis data are accessed by a user other than the owner, i.e., it is indicated that at least one part of the analysis data are accessible for users other than the owner. In practice, the electronic device may detect the information of the operators or viewers through a sensor assembly. The sensor assembly may include an image capturing assembly (e.g. a camera), and by capturing image data using the image capturing assembly (the image capturing assembly may be, for example, a camera in a same plane with a display assembly), a number of the faces included in the image data may be identified. When the number of the faces included in the image data are greater than 1, it may be determined that the number of the operators or viewers is greater than 1. In some embodiments, the owner of the electronic device may be at least one person having the right to access the analysis data or the right to view the analysis data.

The two implementation methods described above may be applied to a scenario in which the displayed content of the electronic device is viewed by users other than the owner. For example, when a user other than the owner approaches the computer screen or mobile phone screen of the user, and the owner currently needs to output a content including analysis data (i.e., privacy data), using the disclosed method of the present disclosure, the electronic device may be able to switch to the second mode such that at least one part of the analysis data may not be outputted to protect the privacy of the user from being learned by others.

By detecting whether a triggering condition is satisfied based on preset rules, the switching method according to the present disclosure may determine or analyze the moments at which analysis data may be leaked. These moments may be determined as the moments having a great probability of leaking the privacy data or data associated with the privacy data. At these moments, switching to the second mode may be performed.

According to the technical schemes of the present disclosure, in response to a triggering condition being satisfied, the electronic device may be switched to a second mode in which analysis data may still be acquired but at least one part of the analysis data may not be outputted. In the second mode, data related to the historical data of one or more of the electronic device, the application in the device, and the owner of the device may not be outputted. Therefore, in the second mode, outputting the analysis data related to the privacy of the user may be blocked, which prevents the content related to the privacy of the user (i.e., the chat history content, the search history content, the account passwords of various applications, the passwords of online banking accounts, the purchase record content, and even the product advisements pushed based on the purchase history) from being viewed by other users. Therefore, the privacy protection of the electronic device may be improved, and the user's operating experience may also be improved.

Figure 3:
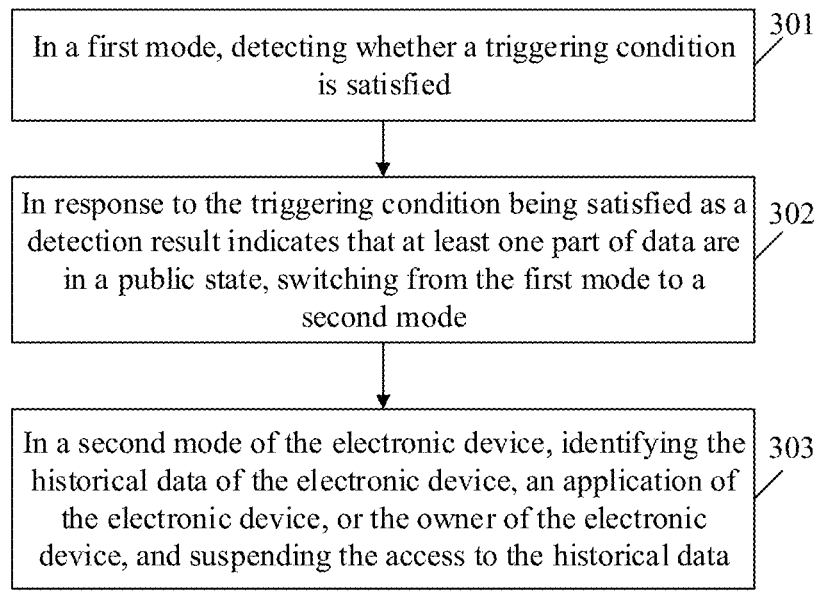
FIG. 3 illustrates a schematic flowchart of another switching method consistent with some embodiments of the present disclosure.

The present disclosure also provides another switching method. FIG. 3 illustrates a schematic flowchart of another switching method consistent with some embodiments of the present disclosure. Referring to FIG. 3, the method may include:

In 301, detecting whether a triggering condition is satisfied in a first mode;

In 302, in response to the triggering condition being satisfied as a detection result indicates that at least one part of the analysis data are in a public state, switching from the first mode to a second mode; and In 303, in the second mode, identifying historical data of one or more of the electronic device, an application in the electronic device, and the owner of the electronic device, and suspending the access to the historical data.

Based on the embodiments described above, in the second mode of the electronic device, the historical data of the electronic device may be identified. In some embodiments, a file storing the historical operation records may be identified, or historical data of an application in the electronic device may be identified. For example, the historical data stored in the electronic device and corresponding to the application, such as a stored file containing the chart record data corresponding to a social application, a stored file containing the search record data corresponding to a browser application, a stored file containing the historical purchase record data corresponding to a shopping application, etc., may be identified. In some other embodiments, the historical data of the owner of the electronic device may be identified. For example, a file including the information data of the owner of the electronic device and stored in the electronic device may be identified. The information data of the owner of the electronic device may include a mobile phone number, an account number and a password of a social application, a payment account and a password, or any other appropriate data.

In some embodiments, after switching to the second mode, access to a file that includes the historical data may be suspended. As such, the electronic device may not be able to acquire the historical data described above, and may also not be able to output the historical data described above. Alternatively, the electronic device may not be able to perform analysis based on the acquired historical data and further output the analysis results, or the electronic device may not be able to generate and output the relevant or recommended data based on the analysis of the acquired historical data such that the privacy of the user may be protected from being known to others.

In some other embodiments, after switching from the first mode to the second mode, the analysis data may be acquired through other methods, but at least one part of the analysis data may not be outputted. For example, switching from the first mode to the second mode may include switching from a first configuration mode to a second configuration mode based on pre-arranged configuration modes. The second configuration mode may be a configuration mode in which the analysis data may be acquired but at least the analysis data may not be outputted, and the first configuration mode may be a configuration mode in which the analysis data can be acquired and outputted.

In some embodiments, the first configuration mode and the second configuration mode may be deployed in an application. After switching from the first mode to the second mode, the first configuration mode may be automatically switched to the second configuration mode. Similarly, after the second mode is restored to the first mode, the second configuration mode may be automatically restored to the first configuration mode. In the second configuration mode, the application may not output at least one part of the analysis data, and in the first configuration mode, the application may output the analysis data.

In the embodiments described above, the acquisition of the analysis data may include analyzing the locally-stored historical data by the electronic device to obtain the analysis data, or sending instruction information to a server by the electronic device such that the server may acquire the analysis data based on the stored historical data. The non-output of the at least one part of the analysis data may include not outputting the analysis data obtained based on the locally-stored historical data, receiving the analysis data sent by a server but not outputting the analysis data, or intercepting the analysis data sent by a server and not outputting the analysis data.

In some embodiments, in both the first mode and the second mode of the electronic device, the analysis data can be acquired. For example, the electronic device may analyze the locally-stored historical data to acquire the analysis data. Alternatively, the electronic device may send instruction information to a server, and the server may perform data analysis to acquire the analysis data based on the pre-obtained historical data (for example, the historical data may be the historical data of one or more of the electronic device, an application in the electronic device, and the owner of the electronic device) sent by the electronic device.

After the electronic device is switched to the second mode, i.e., in the second mode of the electronic device, at least one part of the analysis data may not be outputted. For example, as one implementation method, in the case that the analysis data are obtained based on analysis of the locally-stored historical data, the electronic device may not output the analysis data. Alternatively, as another implementation method, in the case that the analysis data are obtained based on a server, the electronic device may receive the analysis data but may not output the analysis data, or may intercept the analysis data sent by the server. That is, the technical schemes of the present disclosure may, instead of clear the historical data or analysis data, not output the analysis data. In other words, the embodiments of the present disclosure may be able to obtain the analysis data, but may not output at least one part of the analysis data.

The switching method according to the present disclosure may be applied to the following scenarios.

In an example of scenario one, an electronic device is connected to an external display (e.g. a projector). In this application scenario, the display content of the electronic device may be consistent with the projection content outputted by the projector (mirror display). After the electronic device is switched to the second mode, the output content may not include the analysis data, that is, data related to the historical data of one or more of the electronic device, an application in the electronic device, and the owner of the electronic device may not be outputted to ensure that the analysis data are not accessed or viewed by users other than the owner in the application scenario where projection is used.

In an example of scenario two, an electronic device is connected to an external display (e.g. a projector). In this application scenario, the display content of the electronic device may be different from the projection content outputted by the projector, and the display content of the electronic device together with the projection content of the projector may be the entire display content (extended mode). That is, in the application scenario, the entire display content of the electronic device may be displayed using at least two display screens, and the contents displayed in the at least two display screens may be at least partially different from each other. In the application scenario, after the electronic device is switched to the second mode, i.e., in the second mode of the electronic device, the entire display region of the at least two display screens may not output the analysis data, or a part of the display region of the at least two display screens may not output the analysis data. In the latter case, the part of the display region of the at least two display screens not outputting the analysis data may be a part of the display region corresponding to the extended display screen (e.g. a projected screen of a projector) to ensure that the analysis data are not accessed or viewed by users other than the owner.

In an example of scenario three, an electronic device may share a display screen with other electronic devices or an electronic device may be remotely controlled by other electronic devices. That is, in the application scenario, screen data may be transmitted through communication between an electronic device and other electronic devices. In the application scenario, after the electronic device is switched to the second mode, i.e., in the second mode of the electronic device, the entire display region of the electronic device may not output the analysis data such that when users of other electronic devices operate the electronic device, the users of other electronic devices may not be able to view the analysis data of the electronic device. Therefore, the privacy of the user of the electronic device may be protected.

In an example of scenario four, the display screen of an electronic device may be viewed by a plurality of users. The application scenario may be based on the three application scenarios described above. That is, the application scenario may not limited to an external projector connected to an electronic device, an extended display screen of an electronic device, a shared screen of an electronic device, or an electronic device remotely controlled by other electronic devices. As long as a plurality of users are in front of a display screen of an electronic device, and the plurality of users include one or more users other than the owner of the electronic device, after the electronic device is switched to the second mode, i.e., in the second mode of the electronic device, the entire display region of the electronic device may not output the analysis data to prevent users other than the owner from viewing the analysis data of the electronic device. As such, the privacy of the user of the electronic device may be protected.

In the application scenario described above, the analysis data may not be outputted to all or a part of the display region of the electronic device. In some other embodiments, based on the application, the analysis data of the corresponding application may not be outputted. For example, the analysis data in the windows corresponding to all the applications may not be outputted. In another example, the analysis data in windows corresponding to specific applications may not be outputted. Alternatively, in a case that the windows corresponding to all the applications or specific applications are in a specific display region of the electronic device, the analysis data in the windows corresponding to all the applications or specific applications in the specific display region may not be outputted.

Figure 4:
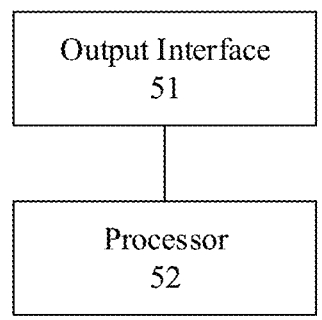
FIG. 4 illustrates a schematic structural view of an electronic device consistent with some embodiments of the present disclosure.

The present disclosure also provides an electronic device. FIG. 4 illustrates a schematic structural view of an electronic device consistent with some embodiments of the present disclosure. Referring to FIG. 4, the electronic device may include an output interface 51 for outputting analysis data, and a processor 52.

In a first mode of the electronic device, the processor 52 may detect whether a triggering condition is satisfied. In response to the triggering condition being satisfied, the processor 52 may control the first mode to switch to a second mode. The first mode may be a mode in which analysis data can be acquired and outputted, and the second mode may be a mode in which analysis data can be acquired but at least one part of the analysis data may not be outputted. The analysis data may be data related to the historical data of one or more of the electronic device, an application in the electronic device, and the owner of the electronic device.

In some embodiments, the analysis data may be data related to the historical data of one or more of the electronic device, an application in the electronic device, and the owner of the electronic device. For example, the analysis data may be the historical data. Alternatively, the analysis data may be the analysis results obtained by analyzing the historical data, or may be relevant or recommended data generated in response to the analysis results obtained by analyzing the historical data.

In some embodiments, the mode of the non-output of the at least one part of the analysis data may include a mode in which the application corresponding to the at least one part of the analysis data in the public state does not output the analysis results, or a mode in which all the applications or the running applications do not output analysis data.

Those skilled in the art should understand that the functions of the processing units in the electronic device according to the present disclosure may be interpreted by referring to the corresponding descriptions in the switching method described above. The processing units of the electronic device according to the present disclosure may be implemented through analog circuits that can realize the functions described in the embodiments of the present disclosure, or may be implemented by running software on an intelligent terminal to execute the functions described in the embodiments of the present disclosure.

The present disclosure also provides another electronic device. Referring to FIG. 4, the electronic device may include an output interface 51 for outputting analysis data, and a processor 52.

In a first mode of the electronic device, the processor 52 may detect whether a triggering condition is satisfied. In response to the detection result indicating that at least one part of the analysis data are in a public state, the triggering condition is satisfied, and the processor 52 may control the first mode to switch to a second mode. The first mode may be a mode in which analysis data can be acquired and outputted, and the second mode may be a mode in which analysis data can be acquired but at least one part of the analysis data may not be outputted. The analysis data may be data related to the historical data of one or more of the electronic device, an application in the electronic device, and the owner of the electronic device.

In some embodiments, the processor 52 may determine that the triggering condition is satisfied in response to the detection result indicating that at least one part of the analysis data are in a public state, or in response to the detection result indicating that at least one part of the analysis data are accessible to a user other than the owner, i.e., at least one part of the analysis data are accessible to users other than the owner.

In some embodiments, the output interface 51 may include at least one of the following interfaces: a data output interface, a display interface, and an interface for transmitting the display data.

As a first implementation method, the processor 52 may detect the interface state of a data output interface, a display interface, or an interface for transmitting the display data. In response to at least one of the interface state of the data output interface, the display interface, and the interface for transmitting the display data being detected to be in a connected state, it is indicated that at least one part of the analysis data are in the publicly-outputted state.

As a second implementation method, the processor 52 may detect the interface state of a data output interface. In response to detecting that at least one part of the analysis data are outputted through the data output interface, it is indicated that at least one part of the analysis data are in a publicly-outputted state.

As a third implementation method, the processor 52 may detect the information of operators or viewers of at least one part of the analysis data of the electronic device. When the operators or viewers are detected to include at least one user other than the owner, it is indicated that at least one part of the analysis data are accessed by a user other than the owner, i.e., it is indicated that at least one part of the analysis data are accessible for users other than the owner.

As a fourth implementation method, the processor 52 may detect a number of the operators or viewers of the at least one part of the analysis data of the electronic device. When the number of the operators or viewers is detected to be greater than 1, it is indicated that at least one part of the analysis data are accessed by a user other than the owner, i.e., it is indicated that at least one part of the analysis data are accessible for users other than the owner.

In some embodiments, the analysis data may be data related to the historical data of one or more of the electronic device, an application in the electronic device, and the owner of the electronic device. For example, the analysis data may be the historical data. Alternatively, the analysis data may be the analysis results obtained by analyzing the historical data, or may be relevant or recommended data generated in response to the analysis results obtained by analyzing the historical data.

In some embodiments, the mode of the non-output of the at least one part of the analysis data may include a mode in which the application corresponding to the at least one part of the analysis data in the public state does not output the analysis results, or a mode in which all the applications or the running applications do not output analysis data.

Those skilled in the art should understand that the functions of the processing units in the electronic device according to the present disclosure may be interpreted by referring to the corresponding descriptions in the switching method described above. The processing units of the electronic device according to the present disclosure may be implemented through analog circuits that can realize the functions described in the embodiments of the present disclosure, or may be implemented by running software on an intelligent terminal to execute the functions described in the embodiments of the present disclosure.

The present disclosure also provides another electronic device. Referring to FIG. 4, the electronic device may include an output interface 51 for outputting analysis data, and a processor 52.

In a first mode of the electronic device, the processor 52 may detect whether a triggering condition is satisfied. In response to the detection result indicating that at least one part of the analysis data are in a public state, it is determined that the triggering condition is satisfied, and the processor 52 may control the first mode to switch to a second mode. The first mode may be a mode in which analysis data can be acquired and outputted, and the second mode may be a mode in which analysis data can be acquired but at least one part of the analysis data may not be outputted. The analysis data may be data related to the historical data of one or more of the electronic device, an application in the electronic device, and the owner of the electronic device. In the second mode of the electronic device, the processor 52 may identify the historical data of one or more of the electronic device, the application in the electronic device, and the owner of the electronic device, and suspend the access to the historical data.

In some embodiments, the analysis data may be data related to the historical data of one or more of the electronic device, an application in the electronic device, and the owner of the electronic device. For example, the analysis data may be the historical data. Alternatively, the analysis data may be the analysis results obtained by analyzing the historical data, or may be relevant or recommended data generated in response to the analysis results obtained by analyzing the historical data.

In some embodiments, the mode of the non-output of the at least one part of the analysis data may include a mode in which the application corresponding to the at least one part of the analysis data in the public state does not output the analysis results, or a mode in which all the applications or the running applications do not output analysis data.

Those skilled in the art should understand that the functions of the processing units in the electronic device according to the present disclosure may be interpreted by referring to the corresponding descriptions in the switching method described above. The processing units of the electronic device according to the present disclosure may be implemented through analog circuits that can realize the functions described in the embodiments of the present disclosure, or may be implemented by running software on an intelligent terminal to execute the functions described in the embodiments of the present disclosure.

Figure 5:
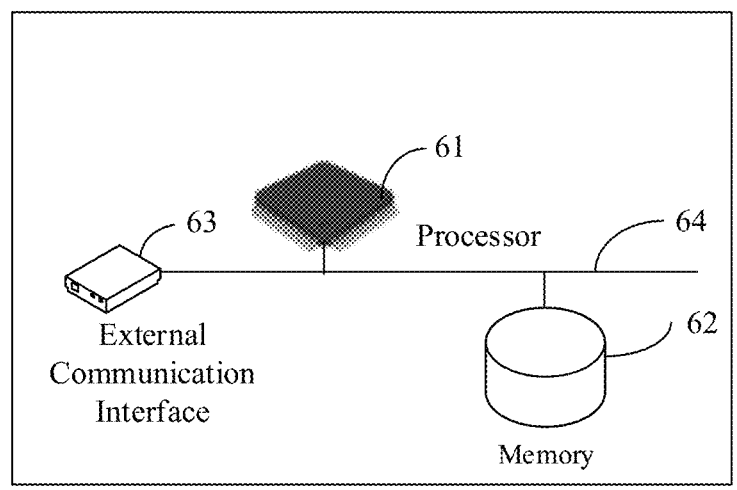
FIG. 5 illustrates a schematic structural view of another electronic device consistent with some embodiments of the present disclosure.

The present disclosure also provides an electronic device, including a memory, a processor, and a computer program stored in the memory and executable on the processor. When the processor executes the computer program, the steps of the switching method according to the present disclosure may be implemented. FIG. 5 illustrates a schematic structural view of another electronic device consistent with some embodiments of the present disclosure.

Referring to FIG. 5, in practical applications, the electronic device may include a processor 61, a memory 62, and at least one external communication interface 63. The processor 61, the memory 62, and the external communication interface 63 may be all connected through a bus 64. In some embodiments, the at least one external communication interface 63 may include a data output interface for connecting a multimedia output device, a display interface for connecting a display device, and an interface for transmitting the display data, etc.

In some embodiments, the processor shown in FIG. 4 and FIG. 5 may be a chip of integrated circuits (ICs) capable of processing signals. In practical implementations, various steps according to the switching method of the present disclosure may be accomplished by integrated logic circuits of hardware or instructions in a software form. The above-described processor may be a general-purpose processor, a digital signal processor (DSP), or other programmable logic device, discrete gate or transistor logic dive, discrete hardware component, etc. The processor may implement or execute the methods, the steps, and the logic blocks consistent with various embodiments of present disclosure. A general purpose processor may be a microprocessor or any conventional processor or the like. The steps of the methods in the various embodiments of the present disclosure may be directly implemented by a hardware decoding processor, or may be implemented by a combination of hardware and software modules in a decoding processor. The software module may be located in a storage medium, and the storage medium may be located in the memory 62. The processor may read the information in the memory 62, and may combine with the hardware to complete the steps of the method described above.

The memory 62 may be implemented by any type of volatile or non-volatile memory device, or a combination of the two. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, or a compact disc read-only memory (CD-ROM). The magnetic surface memory may be a magnetic disc memory, or a magnetic tape memory. The volatile memory may be a random access memory (RAM), which may be used as an external cache. Through illustrative, rather than limiting, descriptions, various forms of RAM may be applicable. For example, the RAM may be a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory, a synclink dynamic random access memory (SLDRAM), a direct rambus random access memory (DRRAM). The memory 62 consistent with the embodiments of the present disclosure is intended to include, but not limited to, the memories described above and any other appropriate types of memories.

The present disclosure also provides a computing memory medium. The computing memory medium stores computer-executable instructions. The computer-executable instructions may be executed by a processor to detect whether a triggering condition is satisfied in a first mode; and switch the first mode to a second mode in response to the triggering condition being satisfied. The first mode may be a mode in which analysis data can be acquired and outputted, and the second mode may be a mode in which analysis data can be acquired but at least one part of the analysis data may not be outputted. The analysis data may be data related to the historical data of one or more of the electronic device, an application in the electronic device, and the owner of the electronic device.

As an implementation method, the instructions may be executed by the processor to realize, in response to the detection result indicating at least one part of the analysis data are in a public state, indicating that the triggering condition is satisfied.

As another implementation method, the instructions may be executed by the processor to realize, in response to the detection result indicating that at least one part of the analysis data are in a publicly-outputted state, or in response to the detection result indicating that at least one part of the analysis data are accessible to a user other than the owner, indicating that the triggering condition is satisfied.

As another implementation method, the instructions may be executed by the processor to realize, detecting an interface state of a data output interface of the electronic device, a display interface, or an interface for transmitting the display data, and in response to detecting that the interface state of the data output interface of the electronic device, the display interface, or the interface for transmitting the display data is in a connected state, indicating that at least one part of the analysis data are in the publicly-outputted state; or detecting an interface state of a data output interface of the electronic device, and in response to detecting that at least one part of the analysis data are outputted through the data output interface, indicating that at least one part of the analysis data are in a publicly-outputted state.

The instructions may be executed by the processor to realize: detecting the information of the operators or viewers of at least one part of the analysis data of the electronic device, and when the operators or viewers are detected to include at least one user other than the owner, indicating that at least one part of the analysis data are accessed by a user other than the owner, or detecting the number of the operators or viewers of the at least one part of the analysis data of the electronic device, and when the number of the operators or viewers is detected to be greater than 1, indicating that at least one part of the analysis data are accessed by a user other than the owner.

As an implementation method, the instructions may be executed by the processor to realize, identifying the historical data of one or more of the electronic device, an application in the electronic device, and the owner of the electronic device, and suspending the access to the historical data.

The methods and devices described in the above embodiments may be realized through other approaches. That is, the description on the methods and devices in the above embodiments may only be schematic examples. For instance, the modules or units may be merely defined based on their logical functions, and in actual applications, the modules or units may be defined based on other criteria. For example, multiple units or components may be combined together or be integrated into another system, or some features may be ignored or may not be executed. Moreover, the coupling between the modules, units, and components illustrated or discussed above may be direct coupling or communication connections through some indirect coupling or communication connections between interfaces, devices, or units. The coupling may be electrical, mechanical, or in any other appropriate form.

The modules or units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with some embodiments of the present disclosure.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through software functional units.

Those of ordinary skill in the art would understand that all or part of the steps for implementing the above methods described in various embodiments of the present disclosure may be completed through relevant hardware instructed by a program. The program may be stored in computer-readable storage media. As the program is executed, the operations including the methods described in above embodiments may be performed. The storage media may include mobile hard disk, ROM, RAM, magnetic disk, optical disk, or any other appropriate media that can be used to store program code.

Alternatively, in scenarios where the integrated units according to the present disclosure are realized through software functional units, and are sold and used as independent products, the integrated units may be stored on computer readable storage media. Based on this understanding, all or a part of the generic principles or the scope of the disclosure may be embodied in software products. The computer software products may be stored in storage media and may include a plurality of commands to instruct a computer system (such as personal computer, server, network system, etc.) to execute all or a part of the procedures described in various embodiments consistent with the present disclosure. The storage media may include mobile hard disk, ROM, RAM, magnetic disk, optical disk, or any other appropriate media that can be used to store program code.

The disclosed embodiments described above are merely some embodiments consistent with the present disclosure, but the protection scope of the present disclosure is not limited thereto. Any modification or substitution readily conceivable by those skilled in the art within the scope of the technology disclosed herein shall fall within the scope of the present disclosure, which is subjected to the appended claims.

What is claimed is:

1. A switching method, comprising:
   detecting whether a triggering condition is satisfied in a first mode of an electronic device; and
   in response to the triggering condition being satisfied, switching from the first mode to a second mode, wherein:
   the first mode enables acquisition and output of analysis data, the second mode enables acquisition of the analysis data and non-output of at least one part of the analysis data, including disabling output of the at least one part of the analysis data to an output interface of the electronic device having a direct physical connection with an external display device and enabling output of the at least one part of the analysis data on a local display region of an internal display screen of the electronic device, wherein the external display device is an extended display for simultaneously presenting together additional contents other than contents presented on the internal display screen of the electronic device;
   the analysis data are related to historical data of one or more of the electronic device, an application in the electronic device, and an owner of the electronic device;

the triggering condition is satisfied upon detecting that the at least one part of the analysis data is in a public state;

an application in the electronic device corresponds to the at least one part of the analysis data in the public state, wherein the application does not output the at least one part of the analysis data when at least one part of a display window of the application is located in a specific display region, and the application outputs the at least one part of the analysis data when the display window of the application is not located in the specific display region.

2. The method according to claim 1, wherein detecting that the at least one part of the analysis data are in the public state includes one or more of:

a detection result indicating that the at least one part of the analysis data are in a publicly-outputted state; and a detection result indicating that the at least one part of the analysis data are accessible to a user other than the owner.

3. The method according to claim 2, wherein the detection result indicating that the at least one part of the analysis data in the publicly-outputted state includes one or more of:

a detection of a connected state of an interface state of one or more of a data output interface of the electronic device, a display interface, and an interface for transmitting display data; and a detection of the interface state of the data output interface of the electronic device having the at least one part of the analysis data outputted through the data output interface.

4. The method according to claim 2, wherein the detection result indicating that the at least one part of the analysis data are accessible to the user other than the owner includes one or more of:

a detection that operators or viewers of the at least one part of the analysis data of the electronic device include the user other than the owner; and a detection of more than one operator or viewer of the at least one part of the analysis data of the electronic device.

5. The method according to claim 1, further including:

in response to enabling the non-output of the at least one part of the analysis data, all applications or running applications in the electronic device do not output the at least one part of the analysis data.

6. The method according to claim 1, further comprising:

identifying the historical data of one or more of the electronic device, the application in the electronic device, and the owner of the electronic device to suspend an access to the historical data in the second mode.

7. The method according to claim 1, wherein the analysis data further includes one or more of:

analysis results by analyzing the historical data; and relevant or recommended data generated in response to the analysis results by analyzing the historical data.

8. An electronic device, comprising:

an output interface for outputting analysis data;

a memory; and a processor, coupled with the output interface and the memory, the processor being configured to:

detect whether a triggering condition is satisfied in a first mode of the electronic device; and in response to the triggering condition being satisfied control the electronic device to switch from the first mode to a second mode, wherein:

the first mode enables acquisition and output of analysis data, the second mode enables acquisition of the analysis data and non-output of at least one part of the analysis data, including disabling output of the at least one part of the analysis data to the output interface of the electronic having a direct physical connection with an external display device and enabling output of the at least one part of the analysis data on a local display region of an internal display screen of the electronic device, wherein the external display device is an extended display for simultaneously presenting together additional contents other than contents presented on the internal display screen of the electronic device, the analysis data are related to historical data of one or more of the electronic device, an application in the electronic device, and an owner of the electronic device;

the triggering condition is satisfied upon detecting that the at least one part of the analysis data is in a public state;

an application in the electronic device corresponds to the at least one part of the analysis data in the public state, wherein the application does not output the at least one part of the analysis data when at least one part of a display window of the application is located in a specific display region, and the application outputs the at least one part of the analysis data when the display window of the application is not located in the specific display region.

9. The electronic device according to claim 8, wherein the processor detecting that the at least one part of the analysis data are in the public state includes one or more of:

a detection result of the processor indicating that the at least one part of the analysis data are in a publicly-outputted state; and a detection result of the processor indicating that the at least one part of the analysis data are accessible to a user other than the owner.

10. The electronic device according to claim 9, wherein the detection result of the processor indicating that the at least one part of the analysis data are in a publicly-outputted state includes one or more of:

a detection of a connected state of an interface state of one or more of a data output interface of the electronic device, a display interface, and an interface for transmitting display data; and a detection of the interface state of the data output interface of the electronic device having the at least one part of the analysis data outputted through the data output interface.

11. The electronic device according to claim 9, wherein the detection result of the processor indicating that the at least one part of the analysis data are accessible to the user other than the owner includes one or more of:

a detection that operators or viewers of the at least one part of the analysis data of the electronic device include the user other than the owner; and a detection of more than one operator or viewer of the at least one part of the analysis data of the electronic device.

12. The electronic device according to claim 8, wherein the processor is further configured to:

identify the historical data of one or more of the electronic device, the application in the electronic device, and the owner of the electronic device, and suspends an access to the historical data in the second mode.

13. The electronic device according to claim 8, wherein the analysis data further includes one or more of:

analysis results obtained by analyzing the historical data; and relevant or recommended data generated in response to the analysis results obtained by analyzing the historical data.

14. The electronic device according to claim 8, wherein the processor is further configured to:

execute an application corresponding to the at least one part of the analysis data in the public state;

disable output of the at least one part of the analysis data on the application when at least one part of a display window of the application is located in a specific display region; and enable output of the at least one part of the analysis data on the application when the display window of the application is not located in the specific display region.

15. A non-transitory computer-readable storage medium, having a computer-executable instructions stored thereon, wherein when being executed, the computer-executable instructions cause a processor to perform a switching method, the method comprising:

detecting whether a triggering condition is satisfied in a first mode of an electronic device; and in response to the triggering condition being satisfied, switching from the first mode to a second mode, wherein:

the first mode enables acquisition and output of analysis data, the second mode enables acquisition of the analysis data and non-output of at least one part of the analysis data, including disabling output of the at least one part of the analysis data to an output interface of the electronic device having a direct physical connection with an external display device and enabling output of the at least one part of the analysis data on a local display region of an internal display screen of the electronic device, wherein the external display device is an extended display for simultaneously presenting together additional contents other than contents presented on the internal display screen of the electronic device;

the analysis data are related to historical data of one or more of the electronic device, an application in the electronic device, and an owner of the electronic device;

the triggering condition is satisfied upon detecting that the at least one part of the analysis data is in a public state;

an application in the electronic device corresponds to the at least one part of the analysis data in the public state, wherein the application does not output the at least one part of the analysis data when at least one part of a display window of the application is located in a specific display region, and the application outputs the at least one part of the analysis data when the display window of the application is not located in the specific display region.

16. The method according to claim 1, further comprising: in the second mode, when a display window of an application corresponding to the at least one part of the analysis data is located in a region of the external display, disabling displaying the at least one part of the analysis data in the display window of the application;

when the display window of the application is located in the local display region of the internal display screen, displaying the at least one part of the analysis data in the display window of the application; and when the display window covers both the region of the external display and the local display region of the internal display screen, displaying the at least one of the of the analysis data in the local display region of the internal display screen and disabling displaying the at least one of the of the analysis data in the region of the external display.

* * * * *